United States Patent
Koli

(10) Patent No.: US 9,491,015 B2
(45) Date of Patent: Nov. 8, 2016

(54) THREE-WIRE THREE-LEVEL DIGITAL INTERFACE

(71) Applicant: ST-Ericsson SA, Plan-les-Ouates (CH)

(72) Inventor: Kimmo Koli, Turku (FI)

(73) Assignee: ST-ERICSSON SA, Plan-les-Ouates (CH)

(*) Notice: Subject to any disclaimer, the term of this patent is extended or adjusted under 35 U.S.C. 154(b) by 0 days.

(21) Appl. No.: 14/892,739

(22) PCT Filed: Jun. 17, 2014

(86) PCT No.: PCT/EP2014/062777
§ 371 (c)(1),
(2) Date: Nov. 20, 2015

(87) PCT Pub. No.: WO2014/202641
PCT Pub. Date: Dec. 24, 2014

(65) Prior Publication Data
US 2016/0127159 A1     May 5, 2016

(30) Foreign Application Priority Data

Jun. 17, 2013   (EP) .................................... 13172355

(51) Int. Cl.
*H04L 7/00*       (2006.01)
*H04L 25/49*      (2006.01)
*H04L 25/02*      (2006.01)
*H04B 7/06*       (2006.01)

(52) U.S. Cl.
CPC .............. *H04L 25/4917* (2013.01); *H04B 7/06* (2013.01); *H04L 25/0272* (2013.01); *H04L 25/0292* (2013.01); *H04L 7/0079* (2013.01)

(58) Field of Classification Search
CPC ........... H04L 25/4917; H04L 25/0272; H04L 25/0292; H04L 7/0079; H04B 7/06
See application file for complete search history.

(56) References Cited

U.S. PATENT DOCUMENTS

| | | | |
|---|---|---|---|
| 6,359,931 B1 * | 3/2002 | Perino | H04L 5/20 375/257 |
| 6,556,628 B1 | 4/2003 | Poulton et al. | |
| 7,650,526 B2 * | 1/2010 | Alon | G06F 1/10 713/400 |
| 8,970,248 B2 * | 3/2015 | Sengoku | H04L 27/2071 326/21 |

(Continued)

OTHER PUBLICATIONS

International Search Report issued in corresponding International application No. PCT/EP2014/062777, date of completion of the International search Sep. 9, 2014.

(Continued)

*Primary Examiner* — Jean B Corrielus
(74) *Attorney, Agent, or Firm* — Patent Portfolio Builders PLLC

(57) ABSTRACT

A receiver for a three-wire digital interface, a method for operating a three-wire digital interface, a signalling system comprising the receiver, and a wireless communication device comprising the signalling system. The receiver for a three-wire digital interface comprises a first resistive element coupled between a first input terminal and a first junction node, a second resistive element coupled between a second input terminal and a second junction node, and a third resistive element coupled between a third input terminal and a third junction node. A network comprising first second and third network terminals is coupled to first, second and third junction nodes. The network has substantially the same impedance between all pairs of the first, second and third network terminals.

17 Claims, 12 Drawing Sheets

(56) References Cited

U.S. PATENT DOCUMENTS

| | | | |
|---|---|---|---|
| 9,071,220 B2* | 6/2015 | Sengoku | H03H 2/005 |
| 9,337,997 B2* | 5/2016 | Sengoku | H04L 7/033 |

OTHER PUBLICATIONS

Written Opinion of the International Searching Authority issued in corresponding International application No. PCT/EP2014/062777, date of mailing Sep. 18, 2014.

Extended European Search Report issued in corresponding European application No. EP 13 17 2355, date of completion of the search Sep. 13, 2013.

Zogopoulos, Sotirios et al., "High-Speed Single-Ended Parallel Link Based on Three-Level Differential Encoding," IEEE Journal of Solid-State Circuits, vol. 44, No. 2, Feb. 1, 2009, pp. 549-557, XP011243176, DOI: 10.1109/JSSC.2008.2011038.

* cited by examiner

|  |  | States ||||||||||||
|---|---|---|---|---|---|---|---|---|---|---|---|---|---|
|  |  | 1 | 2 | 3 | 4 | 5 | 6 | 7 | 8 | 9 | 10 | 11 | 12 |
| Input Terminal Voltages | $V_A$ | $-V_i$ | $V_i$ | $-V_i$ | $V_i$ | 0 | 0 | $-V_i$ | $V_i$ | $V_i$ | $-V_i$ | $-V_i$ | $V_i$ |
| | $V_B$ | $V_i$ | $-V_i$ | 0 | 0 | $-V_i$ | $V_i$ | $V_i$ | $-V_i$ | $-V_i$ | $V_i$ | $-V_i$ | $V_i$ |
| | $V_C$ | 0 | 0 | $V_i$ | $-V_i$ | $V_i$ | $-V_i$ | $-V_i$ | $V_i$ | $-V_i$ | $V_i$ | $V_i$ | $-V_i$ |
| Input Terminal Currents | $I_A$ | $-I_1$ | $I_1$ | $-I_1$ | $I_1$ | 0 | 0 | $-I_2$ | $I_2$ | $2I_2$ | $-2I_2$ | $-I_2$ | $I_2$ |
| | $I_B$ | $I_1$ | $-I_1$ | 0 | 0 | $-I_1$ | $I_1$ | $2I_2$ | $-2I_2$ | $-I_2$ | $I_2$ | $-I_2$ | $I_2$ |
| | $I_C$ | 0 | 0 | $I_1$ | $-I_1$ | $I_1$ | $-I_1$ | $-I_2$ | $I_2$ | $-I_2$ | $I_2$ | $2I_2$ | $-2I_2$ |
| Output Terminal Signals | AJ | 0 | 1 | 0 | 1 | 1 | 0 | 0 | 1 | 1 | 0 | 0 | 1 |
| | AK | 0 | 1 | 0 | 1 | 0 | 1 | 0 | 1 | 1 | 0 | 0 | 1 |
| | BJ | 1 | 0 | 0 | 1 | 0 | 1 | 1 | 0 | 0 | 1 | 0 | 1 |
| | BK | 1 | 0 | 1 | 0 | 0 | 1 | 1 | 0 | 0 | 1 | 0 | 1 |
| | CJ | 1 | 0 | 1 | 0 | 1 | 0 | 0 | 1 | 0 | 1 | 1 | 0 |
| | CK | 0 | 1 | 1 | 0 | 1 | 0 | 0 | 1 | 0 | 1 | 1 | 0 |

FIG. 2

|  |  | States | | | | | | | | | | | |
|---|---|---|---|---|---|---|---|---|---|---|---|---|---|
|  |  | 1 | 2 | 3 | 4 | 5 | 6 | 7 | 8 | 9 | 10 | 11 | 12 |
| Control Signals | XA | 0 | 1 | 0 | 1 | 1(0) | 0(1) | 0 | 1 | 1 | 0 | 0 | 1 |
| | YA | 0 | 1 | 0 | 1 | 0(1) | 1(0) | 0 | 1 | 1 | 0 | 0 | 1 |
| | YB | 1 | 0 | 0(1) | 1(0) | 0 | 1 | 1 | 0 | 0 | 1 | 0 | 1 |
| | ZB | 1 | 0 | 1(0) | 0(1) | 0 | 1 | 1 | 0 | 0 | 1 | 0 | 1 |
| | ZC | 1(0) | 0(1) | 1 | 0 | 1 | 0 | 0 | 1 | 0 | 1 | 1 | 0 |
| | XC | 0(1) | 1(0) | 1 | 0 | 1 | 0 | 0 | 1 | 0 | 1 | 1 | 0 |
| Input Terminal Voltages | $V_A$ | $-V_i$ | $V_i$ | $-V_i$ | $V_i$ | 0 | 0 | $-V_i$ | $V_i$ | $V_i$ | $-V_i$ | $-V_i$ | $V_i$ |
| | $V_B$ | $V_i$ | $-V_i$ | 0 | 0 | $-V_i$ | $V_i$ | $V_i$ | $-V_i$ | $-V_i$ | $V_i$ | $-V_i$ | $V_i$ |
| | $V_C$ | 0 | 0 | $V_i$ | $-V_i$ | $V_i$ | $-V_i$ | $-V_i$ | $V_i$ | $-V_i$ | $V_i$ | $V_i$ | $-V_i$ |
| Input Terminal Currents | $I_A$ | $-I_1$ | $I_1$ | $-I_1$ | $I_1$ | 0 | 0 | $-I_2$ | $I_2$ | $2I_2$ | $-2I_2$ | $-I_2$ | $I_2$ |
| | $I_B$ | $I_1$ | $-I_1$ | 0 | 0 | $-I_1$ | $I_1$ | $2I_2$ | $-2I_2$ | $-I_2$ | $I_2$ | $-I_2$ | $I_2$ |
| | $I_C$ | 0 | 0 | $I_1$ | $-I_1$ | $I_1$ | $-I_1$ | $-I_2$ | $I_2$ | $-I_2$ | $I_2$ | $2I_2$ | $-2I_2$ |

FIG. 11

THREE-WIRE THREE-LEVEL DIGITAL INTERFACE

FIELD OF THE DISCLOSURE

The present disclosure relates to a receiver for a three-wire digital interface, a method of operating such a three-wire digital interface, a signalling system comprising the receiver, and a wireless communication device comprising the signalling system.

BACKGROUND TO THE DISCLOSURE

The digital interface between radio frequency integrated circuits (RFICs) and baseband integrated circuits (BBIC) has to support increasingly high data rates with wireless communication standards such as the Third Generation Partnership Project (3GPP) Long Term Evolution (LTE) standard employing carrier aggregation. Digital interface standards are specified by the Mobile Industry Processor Interface (MIPI) Alliance. The current MIPI DigRF v4 draft interface requires a 5.2 GHz clock for transmitting data in the LTE 20+20+20 case, denoting aggregation of three 20 MHz portions of spectrum, rendering the physical implementation very challenging. These extremely high clock rates are required because the clock and data is transmitted with a single differential line. As an alternative, a three-wire interface is under consideration by the MIPI Alliance. This alternative interface uses three-level signals transmitted over three wires resulting in six unique states for data coding, so that theoretically $\log_2(6)$ bits≈2.585 bits can be transmitted with three wires in one data transmission cycle. If the data is forced to change state every data transmission cycle, five unique states can be used to transfer theoretically $\log_2(5)$ bits≈2.322 bits of data, while also a clock signal can be extracted from the changes in the transmitted signals. Furthermore, by permitting the data to change at both the rising and falling edges of a clock signal, a technique known as Double Data Rate (DDR), the data rate can be further doubled. However, the high bit rates required for the LTE carrier aggregation modes push the operating frequencies of the phase locked loop employed for clock synchronisation into the same range as employed by a frequency synthesizer incorporated in the RFIC. This means that the power consumption of the phase locked loop becomes comparable to the power consumption of the RFIC frequency synthesizer. Moreover, special radio frequency (RF) device modelling, and even special RF devices, such as varactors, are required to implement DigRF v4. In addition, known three-wire digital interfaces require a non-zero voltage difference between each pair of the wires.

SUMMARY OF THE PREFERRED EMBODIMENTS

According to a first aspect there is provided a receiver for a three-wire digital interface, comprising:
first, second and third input terminals;
first, second, third, fourth, fifth and sixth output terminals;
first, second and third junction nodes;
a first resistive element coupled between the first input terminal and the first junction node;
a second resistive element coupled between the second input terminal and the second junction node;
a third resistive element coupled between the third input terminal and the third junction node;
a network comprising first, second and third network terminals coupled to, respectively, the first, second and third junction nodes, the network having substantially the same impedance between all pairs of the first, second and third network terminals;
a first comparator having a non-inverting input coupled to the first input terminal, an inverting input coupled to the second junction node, and an output coupled to the first output terminal;
a second comparator having a non-inverting input coupled to the first input terminal, an inverting input coupled to the third junction node, and an output coupled to the second output terminal;
a third comparator having a non-inverting input coupled to the second input terminal, an inverting input coupled to the third junction node, and an output coupled to the third output terminal;
a fourth comparator having a non-inverting input coupled to the second input terminal, an inverting input coupled to the first junction node, and an output coupled to the fourth output terminal;
a fifth comparator having a non-inverting input coupled to the third input terminal, an inverting input coupled to the first junction node, and an output coupled to the fifth output terminal; and
a sixth comparator having a non-inverting input coupled to the third input terminal, an inverting input coupled to the second junction node, and an output coupled to the sixth output terminal.

The receiver can enable twelve different states of voltages or currents, that is, twelve different permutations of voltage or current values, at the first, second and third input terminals to be received and distinguished. Therefore, a high number of bits can be represented by each state, thereby facilitating high speed data transmission, or enabling a low clock speed and data symbols of long duration to be employed. In general, a high speed digital interface may require precise matching between the input impedance of a receiver and the source impedance presented to the inputs of the receiver, in order to prevent input signals from being reflected. However, by enabling a low clock speed and low symbol rate, the disclosed receiver can relax the requirement for precise matching, thereby enabling the input impedance of the receiver to be increased, enabling the receiver to operate with lower input currents, and reducing power consumption. The receiver also enables a high immunity to noise by ensuring that the minimum voltage difference that is required to be detected within the receiver is high. The receiver is arranged to detect voltage differences, and so avoids the need to generate a voltage reference, such as midway between two supply voltage rails, with which to compare these voltages. This can reduce complexity and improve reliability. The receiver is able to operate with three-level input voltages, where the input voltages are selected from two signalling voltages and one intermediate voltage midway between the two signalling voltages. Where the two signalling voltages have the same magnitude and opposite polarities, and the intermediate voltage may be zero.

The network is a three-terminal network, having first, second and third network terminals coupled to, respectively, the first, second and third junction nodes. The network is electrically symmetrical, meaning that the impedance between all pairs of its first, second and third network terminals is substantially the same.

In one embodiment of the receiver, the network may comprise a fourth resistive element coupled between the first network terminal and a common node, a fifth resistive element coupled between the second network terminal and the common node, and a sixth resistive element coupled between the third network terminal and the common node. This configuration of the network is advantageous in enabling low values of resistance to be used for the fourth to sixth resistive elements, thereby minimizing the size in an integrated circuit. In this embodiment, the network comprising the fourth, fifth and sixth resistive elements may be described as having a star topology or a star configuration.

With such a star configuration, the first, second and third resistive elements may have substantially equal resistance, and the fourth, fifth and sixth resistive elements may each have a substantially equal resistance in the range 0.33 times to 1.67 times the resistance of the first, second and third resistive elements. This feature can enable a high noise immunity by ensuring a high minimum voltage difference between the non-inverting input and inverting input of each of the first to sixth comparators.

In particular, with the star configuration, the first, second and third resistive elements may have substantially equal resistance, and the fourth, fifth and sixth resistive elements may each have a substantially equal resistance in the range greater than 0.67 times the resistance of the first, second and third resistive elements to less than the resistance of the first, second and third resistive elements. This feature can enable a higher minimum voltage between the non-inverting input and inverting input of each of the first to sixth comparators.

More particularly, with the star configuration, the first, second, third, fourth, fifth and sixth resistive elements may have substantially equal resistance. This feature enables low complexity and low size in conjunction with high noise immunity.

Alternatively, with the star configuration, the first, second and third resistive elements may have substantially equal resistance, and the fourth, fifth and sixth resistive elements may each have a substantially equal resistance two thirds times the resistance of the first, second and third resistive elements. This feature enables a high noise immunity and enables the minimum voltage between the non-inverting input and inverting inputs of each of the first to sixth comparators to be the same for each of the first to sixth comparators.

In another embodiment of the receiver, the network may comprise a seventh resistive element coupled between the first network terminal and the second network terminal, an eighth resistive element coupled between the second network terminal and the third network terminal, and a ninth resistive element coupled between the third network terminal and the first network terminal. This configuration of the network is advantageous as it does not require a common node, and therefore can avoid introducing parasitic capacitance of the common node. In this embodiment, the network comprising the fourth, fifth and sixth resistive elements may be described as having a triangular topology or a triangular configuration.

With such a triangular configuration, the first, second and third resistive elements may have substantially equal resistance, and the seventh, eighth and ninth resistive elements may each have a substantially equal resistance in the range equal to the resistance of the first, second and third resistive elements to five times the resistance of the first, second and third resistive elements. This feature can enable a high noise immunity by ensuring a high minimum voltage difference between the non-inverting input and inverting input of each of the first to sixth comparators.

In particular, with the triangular configuration, the first, second and third resistive elements may have substantially equal resistance, and the seventh, eighth and ninth resistive elements each have a substantially equal resistance in the range greater than double to less than triple the resistance of the first, second and third resistive elements. This feature can enable a higher minimum voltage between the non-inverting input and inverting input of each of the first to sixth comparators.

More particularly, with the triangular configuration, the first, second and third resistive elements may have substantially equal resistance, and the seventh, eighth and ninth resistive elements may each have a substantially equal resistance three times the resistance of the first, second and third resistive elements. This feature enables high noise immunity and low complexity.

Alternatively, with the triangular configuration, the first, second and third resistive elements may have substantially equal resistance, and the seventh, eighth and ninth resistive elements may each have a substantially equal resistance double the resistance of the first, second and third resistive elements. This feature enables a high noise immunity and enables the minimum voltage between the non-inverting input and inverting inputs of each of the first to sixth comparators to be the same for each of the first to sixth comparators.

There is also provided a signalling system comprising an encoder, a transmitter, a receiver according to the first aspect, and a decoder. There is also provided a wireless communication device comprising the signalling system.

According to a second aspect there is provided a method of operating a three-wire digital interface, comprising:
providing a receiver according to the first aspect;
establishing voltages at the first, second and third input terminals; and
selecting, dependent on the voltages, different output states of the receiver.

The method enables up to twelve states to be received using a small number of different voltage levels.

For at least one of the output states two of the first, second and third input terminals may be at a common voltage and a third one of the first, second and third input terminals may be at a different voltage. This feature can enable the three-wire digital interface to be operated with a small number of different voltages. The different voltage may be, for example, zero. For one or more of the output states, the common voltage may be, for example, $V_i$, where $V_i$ is a signalling voltage, and for one or more other of the output states the common voltage may be, for example $-V_i$. In this example, one magnitude of voltage is provided, with two different polarities.

For at least one of the output states the first, second and third input terminals (A, B, C) may be at different voltages, wherein one of the first, second and third input terminals (A, B, C) at an intermediate voltage midway between the voltages of the other two of the first, second and third input terminals. This feature can enable the three-wire digital interface to be operated with a small number of different voltages. Two of the different voltages may be, for example, $V_i$ and $-V_i$ where $V_i$ is a signalling voltage, that is, one magnitude of voltage provided with two different polarities, in which case the intermediate voltage is zero.

The method may comprise providing twelve output states of the receiver; wherein for six of the twelve output states two of the first, second and third input terminals are at a common voltage and a third one of the first, second and third input terminals is at a different voltage; and wherein for another six of the twelve output states the first, second and third input terminals are at different voltages, with one of the first, second and third input terminals at an intermediate voltage midway between the voltages of the other two of the first, second and third input terminals. In this way, for example, twelve states may be signalled over the three-wire digital interface by providing only one magnitude of voltage with two different polarities, with the intermediate voltage being zero.

BRIEF DESCRIPTION OF THE DRAWINGS

Preferred embodiments will now be described, by way of example only, with reference to the accompanying drawings, in which:

FIG. 2 is a table of input and output signals for each state of a receiver;

FIG. 11 is a table of transmitter input signals for a transmitter and resulting voltages and currents at outputs of the transmitter for each state to be transmitted.

DETAILED DESCRIPTION OF PREFERRED EMBODIMENTS

Figure 1:
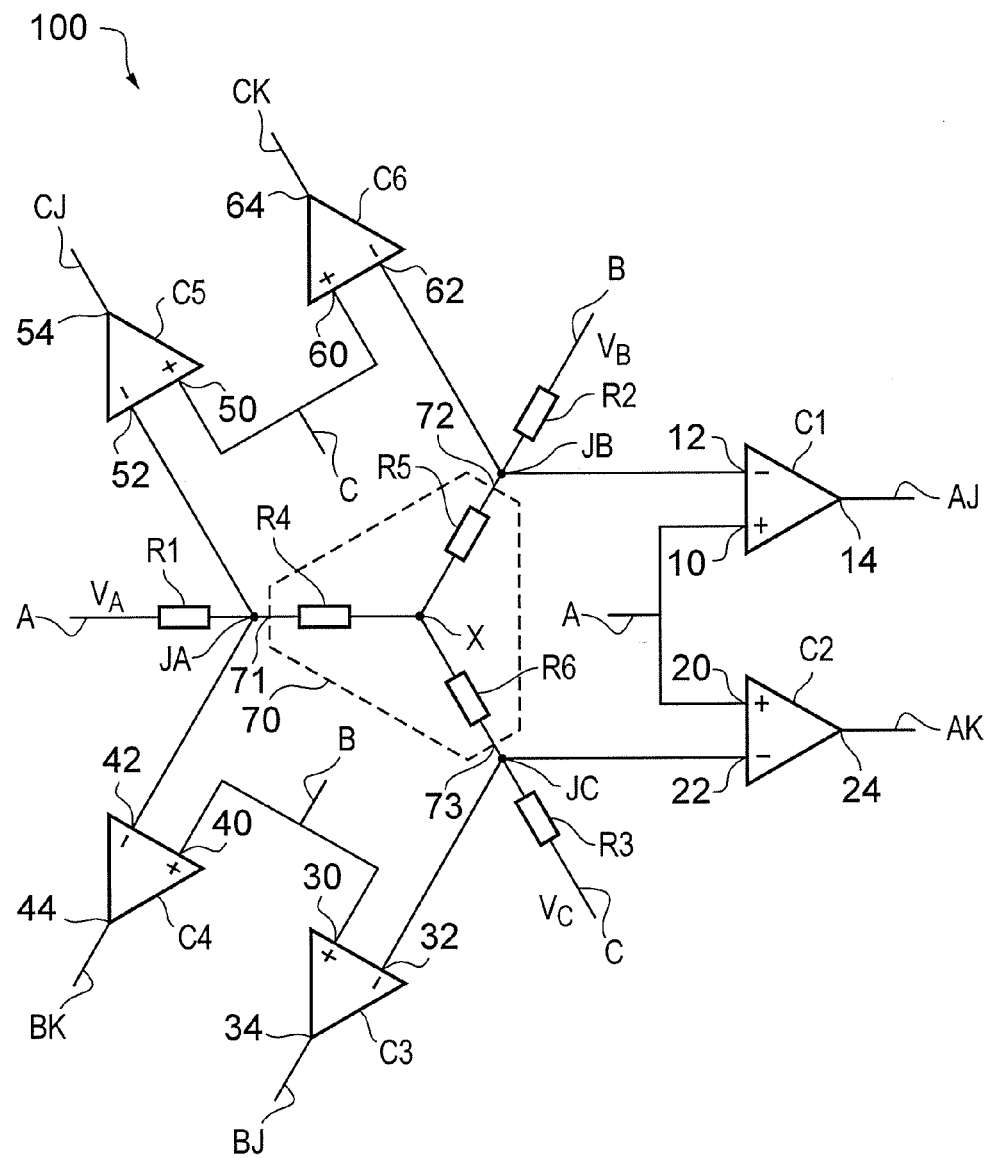
FIG. 1 is a schematic diagram of a receiver.

Referring to FIG. 1, a receiver 100 for a three-wire digital interface, comprises a first input terminal A, a second input terminal B and third input terminal C. In FIG. 1, there are two instances of the first input terminal A; these two instances represent the same first input terminal A, and are merely illustrated separately for clarity of FIG. 1. Likewise, there are two instances of the second input terminal B that represent the single second input terminal B, and two instances of the third input terminal C that represent the single third input terminal C. The receiver 100 has first, second, third, fourth, fifth and sixth output terminals AJ, AK, BJ, BK, CJ, CK, first, second and third junction nodes JA, JB, JC, and a common node X. The common node X may also be referred to as a center node.

A first resistive element R1 is coupled between the first input terminal A and the first junction node JA. A second resistive element R2 is coupled between the second input terminal B and the second junction node JB. A third resistive element R3 coupled between the third input terminal C and the third junction node JC.

A network 70 of a fourth, a fifth and a sixth resistive element R4, R5, R6 has first, second and third network terminals 71, 72, 73 coupled to, respectively, the first, second and third junction nodes JA, JB, JC. The fourth resistive element R4 is coupled between the first network terminal 71 and the common node X, and so is coupled between the first junction node JA and the common node X. The fifth resistive element R5 is coupled between the second network terminal 72 and the common node X, and so is coupled between the second junction node JB and the common node X. The sixth resistive element R6 is coupled between the third network terminal 73 and the common node X, and so is coupled between the third junction node JC and the common node X. Therefore, the fourth, fifth and sixth resistive elements R4, R5, R6 are arranged in a star topology or star configuration. The first, second and third resistive elements R1, R2, R3, have substantially equal resistances, and the fourth, fifth and sixth resistive elements R4, R5, R6 also have substantially equal resistances. Therefore, the network 70 is electrically symmetrical, by which it is meant that the impedance of the network 70 between all pairs of its first, second and third network terminals 71, 72, 73 is substantially the same. Such pairs are the first and second network terminals 71, 72, the second and third network terminals 72, 73, and the third and first network terminals 73, 71. In some embodiments, the resistance of the first, second and third resistive elements R1, R2, R3, is substantially equal to the resistance of the fourth, fifth and sixth resistive elements R4, R5, R6, although in other embodiments this resistance can be different.

There is a first comparator C1 having a non-inverting input 10 coupled to the first input terminal A, an inverting input 12 coupled to the second junction node JB, and an output 14 coupled to the first output terminal AJ. A second comparator C2 has a non-inverting input 20 coupled to the first input terminal A, an inverting input 22 coupled to the third junction node JC, and an output 24 coupled to the second output terminal AK. A third comparator C3 has a non-inverting input 30 coupled to the second input terminal B, an inverting input 32 coupled to the third junction node JC, and an output 34 coupled to the third output terminal BJ. A fourth comparator C4 having a non-inverting input 40 coupled to the second input terminal B, an inverting input 42 coupled to the first junction node JA, and an output 44 coupled to the fourth output terminal BK. A fifth comparator C5 has a non-inverting input 50 coupled to the third input terminal C, an inverting input 52 coupled to the first junction node JA, and an output 54 coupled to the fifth output terminal CJ. A sixth comparator C6 having a non-inverting input 60 coupled to the third input terminal C, an inverting input 62 coupled to the second junction node JB, and an output 64 coupled to the sixth output terminal CK. The first to sixth comparators C1 . . . C6 may be implemented with, for example, N-channel metal oxide semiconductor (NMOS) input transistors and a folded cascode structure.

The receiver 100 described with reference to FIG. 1 is capable of receiving twelve different states of a three-wire interface driven by tri-state drivers. Referring to the table of FIG. 2, the twelve different states are represented by the columns numbered one to twelve. First, second and third input terminal voltages applied to, respectively, the first, second and third input terminals A, B, C are denoted, respectively, $V_A$, $V_B$ and $V_C$. Correspondingly, first, second and third input terminal currents flowing at, respectively, the first, second and third input terminals A, B, C are denoted, respectively, $I_A$, $I_B$ and $I_C$. For each of the twelve states, the first, second and third input terminal voltage $V_A$, $V_B$, $V_C$ can take values 0, $V_i$ or $-V_i$, as indicated in the table of FIG. 2, where $V_i$ is referred to as a signalling voltage, and the zero is midway between $V_i$ and $-V_i$. The resulting values of the first, second and third input terminal currents $I_A$, $I_B$ and $I_C$ are 0, $I_1$ or $-I_1$ for states one to six, and $I_2$, $-I_2$, $2I_2$ or $-2I_2$ for states seven to twelve, as shown in the table of FIG. 2, where a negative value denotes a current flowing out of the receiver 100, and a positive value denotes a current flowing into the receiver 100. A value of zero in the table of FIG. 2 for the first, second and third input terminal currents $I_A$, $I_B$ and $I_C$ indicates that no current flows at the respective input terminal. $I_1$ and $I_2$ are referred to as, respectively, first and second signalling current levels. The relative values of $I_1$ and $I_2$ depend on the resistance of the fourth, fifth and sixth resistive elements R4, R5, R6 relative to the resistance of the first, second and third resistive elements R1, R2, R3. This aspect is described in more detail below.

In state 1, for example, the first input terminal voltage $V_A$ is $-V_i$, the second input terminal voltage $V_B$ is $V_i$, and the third input terminal voltage $V_C$ is zero, resulting in the first input terminal current $I_A$ having a magnitude $I_1$ being drawn from the receiver 100 at the first input terminal A, the second input terminal current $I_B$ of equal magnitude $I_1$ being supplied to the receiver 100 at the second input terminal B, and the third input terminal current $I_A$ being zero, with no current flowing at the third input terminal C. In state 2, the first input terminal voltage $V_A$ is $V_i$, the second input terminal voltage $V_B$ is $-V_i$, and the third input terminal voltage $V_C$ is zero, resulting in the first input terminal current $I_A$ having a magnitude $I_1$ being supplied to the receiver 100 at the first input terminal A, the second input terminal current $I_B$ of equal magnitude $I_1$ being drawn from the receiver 100 at the second input terminal B, and the third input terminal current $I_A$ being zero, with no current flowing at the third input terminal C. In state 3, the first input terminal voltage $V_A$ is $-V_i$, the second input terminal voltage $V_B$ is zero, and the third input terminal voltage $V_C$ is $-V_i$, resulting in the first input terminal current $I_A$ having a magnitude $I_1$ being drawn from the receiver 100 at the first input terminal A, the second input terminal current $I_B$ being zero, with no current flowing at the second input terminal B, and the third input terminal current $I_C$ having a magnitude $I_1$ being supplied to the receiver 100 at the third input terminal C. States 4, 5 and 6 can readily be interpreted in a corresponding manner.

In states 7 to 12, none of the first, second and third input terminal voltages $V_A$, $V_B$ and $V_C$ are zero in the table of FIG. 2, but have values of $V_i$ or $-V_i$ resulting in a non-zero current flowing at each of the first, second and third input terminals A, B, C. Moreover, any two of the first, second and third input terminal voltages $V_A$, $V_B$, $V_C$ can have the same value. For example, in state 7, the first and third input terminal voltages $V_A$, $V_C$ are $-V_i$, and the second input terminal voltage $V_B$ is $V_i$, resulting in the second input terminal current $I_B$ having magnitude $2I_2$ being supplied to the receiver 100 at the second input terminal B, and the first and third input terminal currents $I_A$, $I_C$ having a magnitude $I_2$ being drawn from the receiver 100 at each of the first and third input terminals A, C. In state 8, the first and third input terminal voltages $V_A$, $V_C$ are $V_i$ and the second input terminal voltage $V_B$ is $-V_i$, resulting in the second input terminal current $I_B$ having a magnitude $2I_2$ being drawn from the receiver 100 at the second input terminal B, and the first and third input terminal currents $I_A$, $I_C$ having a magnitude $I_2$ being supplied to the receiver 100 at each of the first and third input terminals A, C. States 9 to 12 can readily be interpreted in a corresponding manner.

Figure 3:
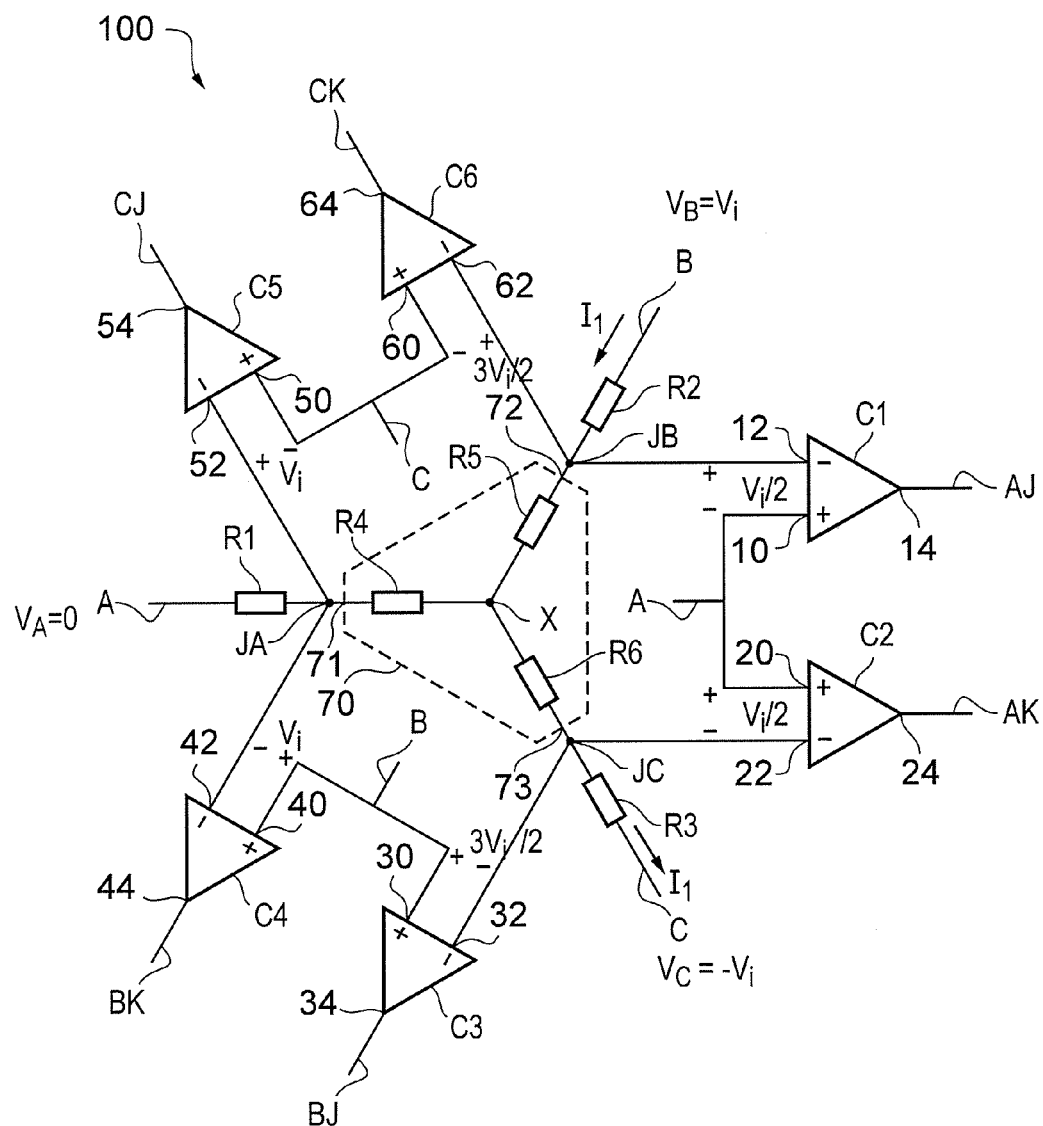
FIG. 3 is a schematic diagram of a receiver illustrating currents and voltages for one state.

Each of the inputs of each of the first to sixth comparators C1 . . . C6 has a high impedance, and so no significant current flows into or out of these inputs. Therefore, all current entering the receiver 100 at one of the first, second or third input terminals A, B, C flows to one or both of the other of the first, second or third input terminals A, B, C. Consequently, a voltage difference is established between the respective non-inverting input and inverting input of each of the first to sixth comparators C1 . . . C6. These voltage differences are illustrated in FIG. 3 for state 6 of FIG. 2, for the case where all of the first to sixth resistive elements R1 . . . R6 have an equal resistance. FIG. 3 reproduces the receiver 100 of FIG. 1, and additionally indicates the first input terminal voltage $V_A$ having a value zero, the second input terminal voltage $V_B$ having a value $V_i$ applied at the second input terminal B, and the third input terminal voltage $V_C$ having a value $-V_i$ applied at the third input terminal C. Also indicated in FIG. 3 are the second and third input terminal currents $I_B$, $I_C$ flowing at the second and third input terminals B, C, and having values of, respectively, $I_1$ and $-I_1$, and the voltage differences established between the respective non-inverting input and inverting input of each of the first to sixth comparators C1 . . . C6. The first comparator C1 has a voltage at its non-inverting input 10 that is a magnitude $V_i/2$ lower than the voltage at its inverting input 12. The second comparator C2 has a voltage at its non-inverting input 20 that is a magnitude $V_i/2$ higher than the voltage at its inverting input 22. The third comparator C3 has a voltage at its non-inverting input 30 that is a magnitude $3V_i/2$ higher than the voltage at its inverting input 32. The fourth comparator C4 has a voltage at its non-inverting input 40 that is a magnitude $V_i$ higher than the voltage at its inverting input 42. The fifth comparator C5 has a voltage at its non-inverting input 50 that is a magnitude $V_i$ lower than the voltage at its inverting input 52. The sixth comparator C6 has a voltage at its non-inverting input 60 that is a magnitude $3V_i/2$ lower than the voltage at its inverting input 62.

In the table of FIG. 2, an entry of zero (0) for the first, second, third, fourth, fifth or sixth output terminals AJ, AK, BJ, BK, CJ, CK, indicates that the voltage at the non-inverting input exceeds the voltage at the inverting input of the corresponding first, second, third, fourth, fifth or sixth comparator C1 . . . C6. Conversely, an entry of one (1) for the first, second, third, fourth, fifth or sixth output terminals AJ, AK, BJ, BK, CJ, CK, indicates that the voltage at the non-inverting input is less than the voltage at the inverting input of the corresponding first, second, third, fourth, fifth or sixth comparator C1 . . . C6. For example, in the case of state 6 described above with reference to FIG. 3, the voltage differences of $V_i/2$, $3V_i/2$ and $V_i$ established between the non-inverting inputs and inverting inputs of, respectively, the second, third and fourth comparators C2, C3, C4 are indicated by a one (1) at the second, third and fourth output terminals AK, BJ, BK, and the voltage differences of $-V_i/2$, $-V_i/$ and $-3V_i/2$ established between the non-inverting inputs and inverting inputs of, respectively, the first, fifth and sixth comparators C1, C5, C6 are indicated by a zero (0) at the first, fifth and sixth output terminals AJ, CJ, CK.

Figure 4:
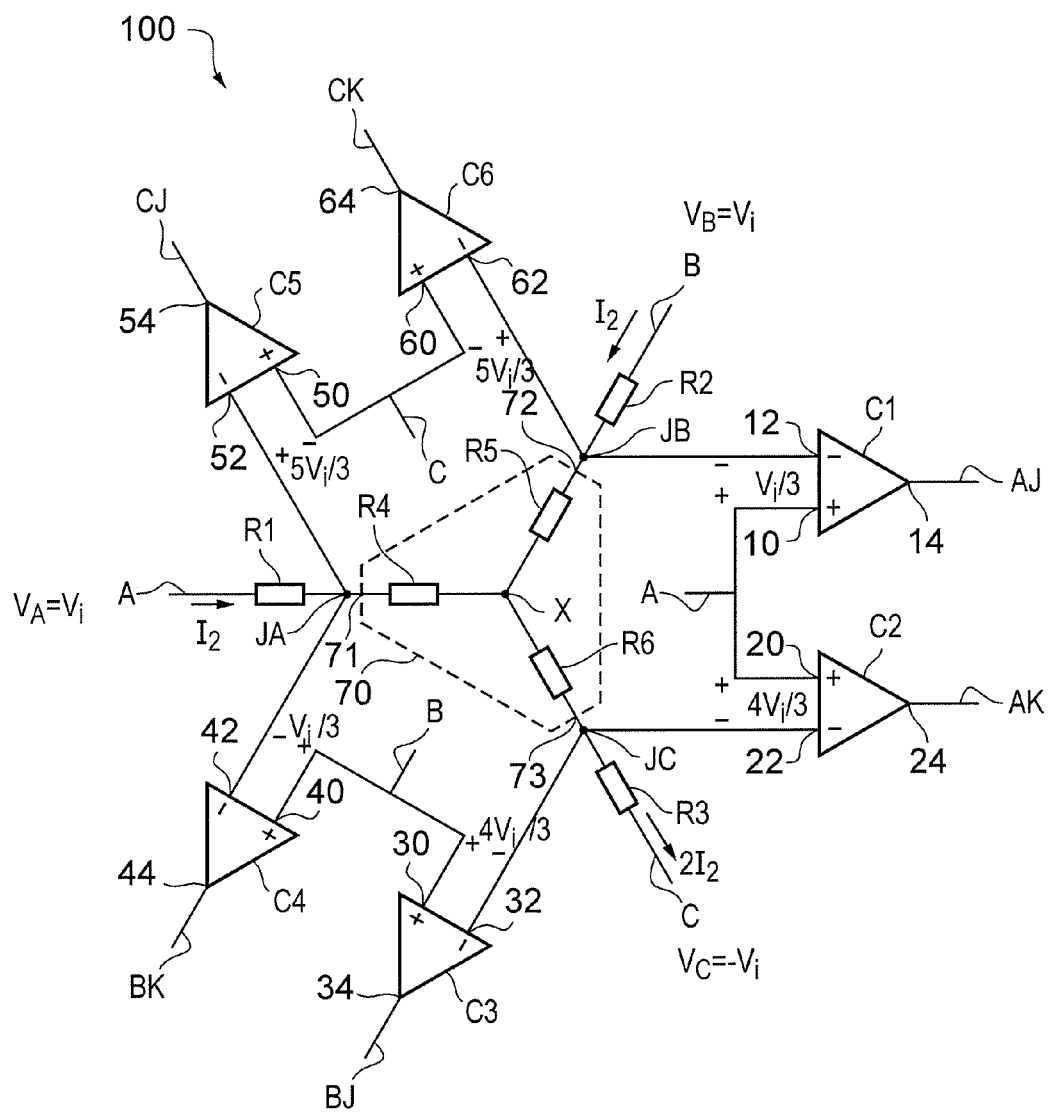
FIG. 4 is a schematic diagram of a receiver illustrating currents and voltages for another state.

The voltage differences are illustrated in FIG. 4 for state 12 illustrated in FIG. 2, for the case where all of the first to sixth resistive elements R1 . . . R6 have an equal resistance. FIG. 4 reproduces the receiver 100 of FIG. 1, and additionally indicates the first and second input terminal voltages $V_A$, $V_B$, having a value $V_i$ applied at the first and second input terminals A, B, and the third input terminal voltage $V_C$ having a value $-V_i$ applied at the third input terminal C. Also indicated in FIG. 4 are the first, second and third input terminal currents $I_A$, $I_B$, $I_C$ flowing at the first to third input terminals A, B, C, and having values of, respectively, $I_2$, $I_2$ and $-2I_2$, and voltage differences established between the respective non-inverting input and inverting input of each of the first to sixth comparators C1 . . . C6. The first comparator C1 has a voltage at its non-inverting input 10 that is a magnitude $V_i/3$ higher than the voltage at its inverting input 12. The second comparator C2 has a voltage at its non-inverting input 20 that is a magnitude $4V_i/3$ higher than the voltage at its inverting input 22. The third comparator C3 has a voltage at its non-inverting input 30 that is a magnitude $4V_i/3$ higher than the voltage at its inverting input 32. The fourth comparator C4 has a voltage at its non-inverting input 40 that is a magnitude $V_i/3$ higher than the voltage at its inverting input 42. The fifth comparator C5 has a voltage at its non-inverting input 50 that is a magnitude $5V_i/3$ lower than the voltage at its inverting input 52. The sixth comparator C6 has a voltage at its non-inverting input 60 that is a magnitude $5V_i/3$ lower than the voltage at its inverting input 62. A similar analysis of voltages for all of the twelve states illustrated in FIG. 2 shows that, for the case where all of the first to sixth resistive elements R1 . . . R6 have an equal resistance, the minimum voltage difference between the non-inverting and inverting inputs of each of the first to sixth comparators C1 . . . C6 has a magnitude $V_i/2$, for states one to six, and a magnitude $V_i/3$ for states seven to twelve. Such a minimum voltage difference can provide a high immunity from noise present at each of the first to third input terminals A, B, C. Where the voltages $V_i$ and $-V_i$ have the same magnitude for all twelve states, and if the resistance of all of the first to sixth resistive elements R1 . . . R6 is denoted R, then it can readily be shown that $I_1=V_i/2R$ and $I_2=V_i/2R$, and therefore $I_2=2 I_1/3$.

Referring again to FIG. 2, the bottom six rows of the table indicate, for each of the twelve states, the value of binary signals at each of the outputs 14, 24, 34, 44, 54, 64 of the first to sixth comparators C1 . . . C6, and therefore at the corresponding first to sixth output terminals AJ, AK, BJ, BK, CJ, CK, of the receiver 100. A zero (0) indicates that the voltage at the non-inverting input of the respective comparator is less than the voltage at the inverting input of that same comparator. A one (1) indicates that the voltage at the non-inverting input of the respective comparator is greater than the voltage at the inverting input of that same comparator. A decoder can be coupled to the first to sixth output terminals AJ, AK, BJ, BK, CJ, CK to map the signals at these output terminals to a different data value for each of the 12 states. For example, in the case of state 12 described above with reference to FIG. 4, the voltage differences of $V_i/3$, $4V_i/3$, $4V_i/3$ and $V_i/3$ established between the non-inverting inputs and inverting inputs of, respectively, the first, second, third and fourth comparators C1, C2, C3, C4 are indicated by a one (1) at the first second, third and fourth output terminals AJ, AK, BJ, BK, and the voltage differences of $-5V_i/3$ and $-5V_i/3$ established between the non-inverting inputs and inverting inputs of, respectively, the fifth and sixth comparators C5, C6 are indicated by a zero (0) at the fifth and sixth output terminals CJ, CK.

As demonstrated above, for the case where all of the first to sixth resistive elements R1 . . . R6 have an equal resistance, the minimum voltage difference between the non-inverting and inverting inputs of each of the first to sixth comparators C1 . . . C6 has a magnitude $V_i/2$, for states one to six, and a magnitude $V_i/3$ for states seven to twelve. Therefore, the noise immunity is greater for states one to six than for states seven to twelve. The noise immunity can be increased for states seven to twelve, and simultaneously made equal for all states, albeit by reducing the noise immunity of states one to six, if the fourth, fifth and sixth resistive elements R4, R5, R6 have an equal resistance less than the resistance of the first, second and third resistive elements R1, R2, R3. If the resistance of the first, second and third resistive elements R1, R2, R3 is denoted R', and the resistance of the fourth, fifth and sixth resistive elements R4, R5, R6 is denoted R", the minimum voltage difference between the non-inverting and inverting inputs of any one of the first to sixth comparator C1 . . . C6 is $R"V_i/(R'+R")$ for states one to six, and $2R'V_i/3(R'+R")$ for states seven to twelve. This minimum voltage difference can be made equal for all twelve states, at a value of $0.4V_i$, by selecting values of R' and R" such that R"=2R'/3 that is, the fourth, fifth and sixth resistive elements R4, R5, R6 have an equal resistance that is two thirds the resistance of the first, second and third resistive elements. In other words, the first, second and third resistive elements R1, R2, R3 have a resistance that is fifty percent greater than the resistance of the fourth, fifth and sixth resistive elements R4, R5, R6.

More generally, selecting the resistance of the fourth, fifth and sixth resistive elements R4, R5, R6 to be in the range from greater than two thirds, or 0.67, times the resistance of the first, second and third resistive elements R1, R2, R, to less than the resistance of the first, second and third resistive elements R1, R2, R3, can ensure that the minimum voltage difference between the non-inverting and inverting inputs of any one of the first to sixth comparator C1 . . . C6 is in the range greater than $V_i/3$ to less than $0.4V_i$. This range of resistances of the fourth, fifth and sixth resistive elements R4, R5, R6 may be expressed as 2R'/3<R"<R'.

In applications where a smaller minimum voltage difference between the non-inverting and inverting inputs of any one of the first to sixth comparator C1 . . . C6, is acceptable, thereby providing reduced noise immunity, the resistance of the fourth, fifth and sixth resistive elements R4, R5, R6 may be selected outside of the range from two thirds to equal the resistance of the first, second and third resistive elements R1, R2, R3. However, in order to prevent the minimum voltage difference between the non-inverting and inverting inputs of any one of the first to sixth comparator C1 . . . C6 falling below $V_i/4$, thereby degrading the noise immunity substantially, it is preferred that the resistance of the fourth, fifth and sixth resistive elements R4, R5, R6 is within the range from one third (1/3) times, to one and two thirds (5/3) times, the resistance of the first, second and third resistive elements R1, R2, R3. In other words, the resistance of the fourth, fifth and sixth resistive elements R4, R5, R6 is preferably within the range from one third, or 0.33, times, to one and two thirds, or 1.67, times, the resistance of the first, second and third resistive elements R1, R2, R3. This range of resistances of the fourth, fifth and sixth resistive elements R4, R5, R6 may be expressed as R'/3≤R"≤5R'/3.

In one example, the signalling voltage $V_i$ may be 200 mV volts, the resistance of the first to sixth resistive elements R1 . . . R6 may be 50 ohms and consequently the first and second signalling current levels $I_1$, $I_2$ may be, respectively, 2 mA and 1.333 mA.

Figure 5:
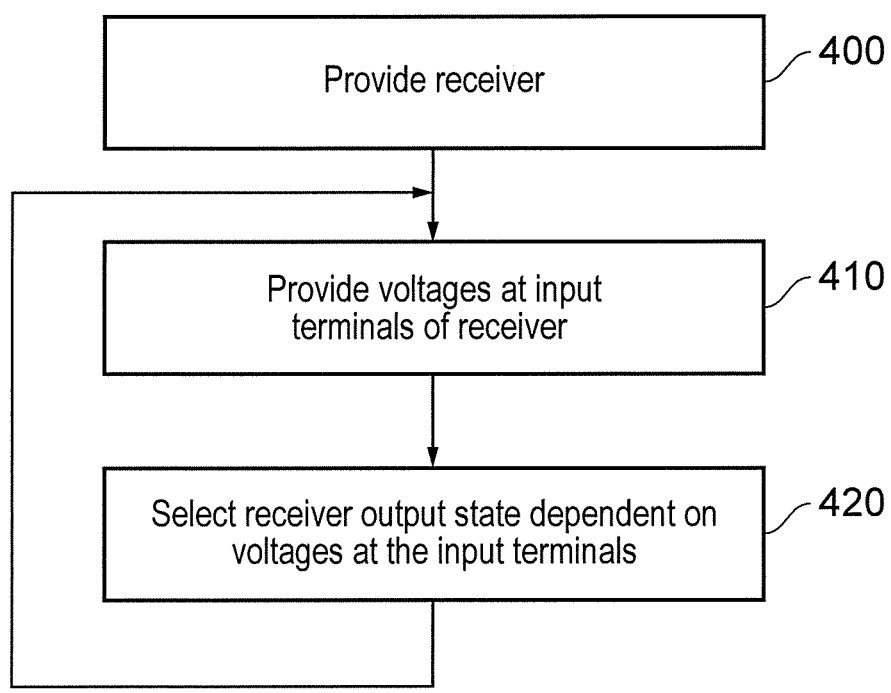
FIG. 5 is a flow chart of a method of operating a three-wire digital interface.

Referring to FIG. 5, a method of operating a three-wire digital interface comprises, at step 400, providing the receiver 100 described with reference to FIG. 1, and executing a plurality of passes of a loop comprising steps 410 and 420. Each pass of step 410 comprises establishing voltages at the first, second and third input terminals A, B, C of the receiver 100, for which a permutation of voltages is selected from a set of different permutations of voltages. Each pass of step 420 comprises selecting, dependent on the voltages, different output states of the receiver (100). In particular, for at least one output state corresponding to one of the selected permutations of voltage, two of the first, second and third input terminals A, B, C can be at a common voltage and the other one of the first, second and third input terminals A, B, C can be at a different voltage. Therefore, the at least one of the selected permutations may correspond to the input terminal voltages for any of states seven to twelve illustrated in the table of FIG. 2. In particular, for states seven, nine and eleven the common voltage is $-V_i$, that is, equal to the negative of the signalling voltage $V_i$, and the different voltage is $V_i$, that is, equal to the signalling voltage $V_i$, whilst for states eight, ten and twelve the common voltage is $V_i$, that is, equal to the signalling voltage $V_i$ and the different voltage is $-V_i$, that is, equal to the negative of the signalling voltage $V_i$. Therefore, in this case the selected permutations are permutations of one of the sets $[V_i, V_i, -V_i]$ and $[-V_i, -V_i, V_i]$. In another example, for at least one of the selected permutations, corresponding to another output state of the receiver, one of the first, second and third input terminals A, B, C can be at a signalling voltage, another of the first, second and third input terminals A, B, C can be at a different voltage, for example the negative of the signalling voltage, and the third one of the first, second and third input terminals A, B, C can be at an intermediate voltage midway between the voltage of the other two of the first, second and third input terminals A, B, C. In particular, for states one to six illustrated in the table of FIG. 2, the selected permutations can be a permutation of the set $[V_i, -V_i, V_f]$, where $V_i$ is the signalling voltage and $V_f$ is the intermediate voltage, which in this example is zero.

Twelve different states may be signalled by employing twelve different permutations of voltages, where six of the twelve permutations are permutations of the sets $[V_i, V_i, -V_i]$ and $[-V_i, -V_i, V_i]$, and six of the twelve permutations are permutations of the set $[V_i, -V_i, V_f]$. More generally, for six of the twelve output states two of the first, second and third input terminals A, B, C can be at a common voltage and a third one of the first, second and third input terminals A, B, C can at a different voltage, and for another six of the twelve output states the first, second and third input terminals A, B, C can be at different voltages with one of the first, second and third input terminals A, B, C at an intermediate voltage midway between the voltage of the other two of the first, second and third input terminals A, B, C.

At each pass of step 420, an output state of the receiver 100 is selected dependent on the permutation of voltages provided at the first, second and third input terminals A, B, C, where different output states of the receiver 100 correspond to different permutations of the voltages. The different output states of the receiver 100 may correspond to the states one to twelve illustrated in FIG. 2, and be indicated by the output terminal signals illustrated in FIG. 2, and the different permutations of voltage may correspond to the input terminal voltages illustrated in FIG. 2 for any of states one to twelve.

Therefore, the selected output state of the receiver 100 can be indicated by the permutation of binary signals at the first to sixth output terminals AJ, AK, BJ, BK, CJ, CK of the receiver 100.

Figure 6:
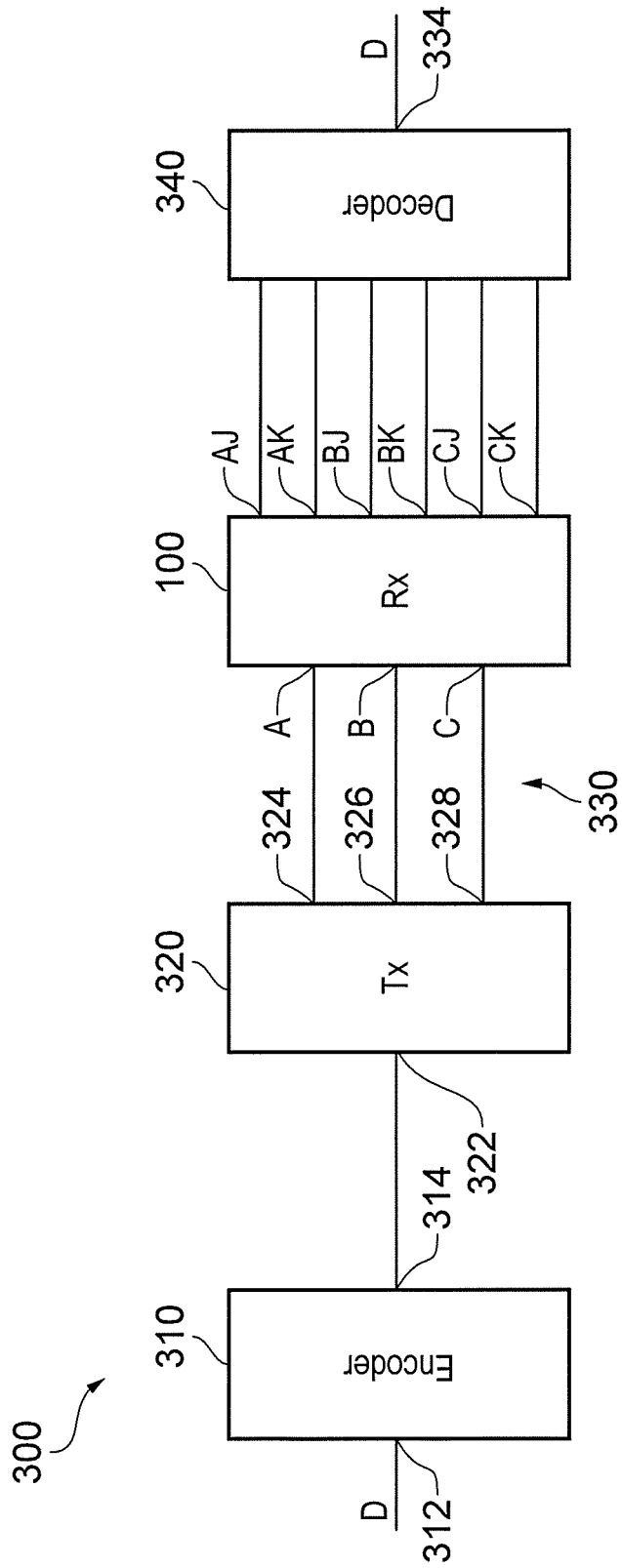
FIG. 6 is a schematic diagram of a signalling system.

Referring to FIG. 6, a signalling system 300, which can also be referred to as a three-wire digital interface, comprises an encoder 310, a transmitter 320 coupled to the receiver 100 by means of a three-wire connection 330, and a decoder 340. The encoder 310 has an input 312 for data symbols D. Each data symbol corresponds to a different one of the twelve states illustrated in FIG. 2. The encoder 310 employs a look-up table comprising the three rows of the table of FIG. 2 that map the twelve states to the first, second and third input terminal voltages $V_A$, $V_B$, $V_C$, to map the state corresponding to each data symbol to an indication of the corresponding voltages required at a three-wire connection 330. Therefore, the encoder 310 is arranged to map each different data symbol to an indication of required voltages on the three-wire digital interface. The indication of the required voltages is delivered, as transmitter input signals, at an output 314 of the encoder 310 that is coupled to an input 322 of a transmitter 320. The transmitter 320 generates the required voltages, which are delivered at respective first, second and third outputs 314, 316, 318 of the transmitter 320 which are coupled to the three-wire connection 330. Such a transmitter 320 is a voltage mode transmitter.

Alternatively, the encoder 310 may employ a look-up table comprising the three rows of the table of FIG. 2 that map the twelve states to the first, second and third input terminal currents $I_A$, $I_B$, $I_C$, to map the state corresponding to each data symbol to an indication of the corresponding currents required at a three-wire connection 330. In this case, the encoder 310 is arranged to map each different data symbol to an indication of a different permutation of currents on the three-wire digital interface. The indication of the required currents is delivered, as transmitter input signals, at an output 314 of the encoder 310 that is coupled to an input 322 of a transmitter 320, and the transmitter 320 generates the required currents, which are delivered at respective first, second and third outputs 314, 316, 318 of the transmitter 320 which are coupled to the three-wire connection 330. Such a transmitter 320 is a current mode transmitter. The current mode transmitter and voltage mode transmitter are equivalent, in that the first second and third input terminal currents $I_A$, $I_B$, $I_C$, resulting from the transmitter 320 operating as a voltage mode transmitter generating the first, second and third input terminal voltages $V_A$, $V_B$, $V_C$ illustrated in the table of FIG. 2 which are applied to the first, second and third input terminals A, B, C of the receiver 100, are the same as the first, second and third input terminal currents $I_A$, $I_B$, $I_C$ illustrated in the table of FIG. 2 generated by the transmitter 320 operating as a current mode transmitter, and which, when applied to the first, second and third input terminals A, B, C of the receiver 100, result in the first second and third input terminal voltages $V_A$, $V_B$, $V_C$ illustrated in the table of FIG. 2.

The first, second and third inputs A, B, C of the receiver 100 are coupled to the three-wire interface 330. The first to sixth outputs AJ, AK, BJ, BK, CJ, CK of the receiver 100 are coupled to a decoder 340 which employs a look-up table comprising the bottom six rows of the table in FIG. 2, or an equivalent logic circuit, to map the output terminal signals at the first to sixth outputs AJ, AK, BJ, BK, CJ, CK of the receiver 100 to the states. The decoder 340 also maps each state to a data symbol, and delivers the resulting received data symbols at an output 334 of the decoder 340. Therefore, the decoder 340 is arranged to map each different permutation of output terminal signal values at the first to sixth output terminals AJ, AK, BJ, BK, CJ, CK of the receiver 100 to a different value of a data symbol.

With the twelve available states, up to $\log_2(12)$ bits~3.58 bits can be transmitted in each symbol period. By employing DDR, thereby permitting the data to change at both the rising and falling edges of a clock signal, up to $2 \log_2(12)$ bits~7.16 bits can be transmitted in each clock cycle.

It is not essential for all twelve of the states illustrated in FIG. 2 to be employed to represent data symbols. For example, eight of the twelve states may be used to represent data symbols, with each of these data symbols conveying three bits of data, and four of the twelve states may be used to represent control symbols, such as INIT, for initializing a receiving terminal, START, for initiating communication of data, END, for terminating communication of data, and REPEAT, signifying that the data represented by the previously transmitted data symbol is repeated. This REPEAT control symbol can be used to ensure that there is a change of voltage or current at at least one of the input terminals A, B, C at the beginning of every data symbol period, which can facilitate clock extraction from the received symbols.

Figure 7:
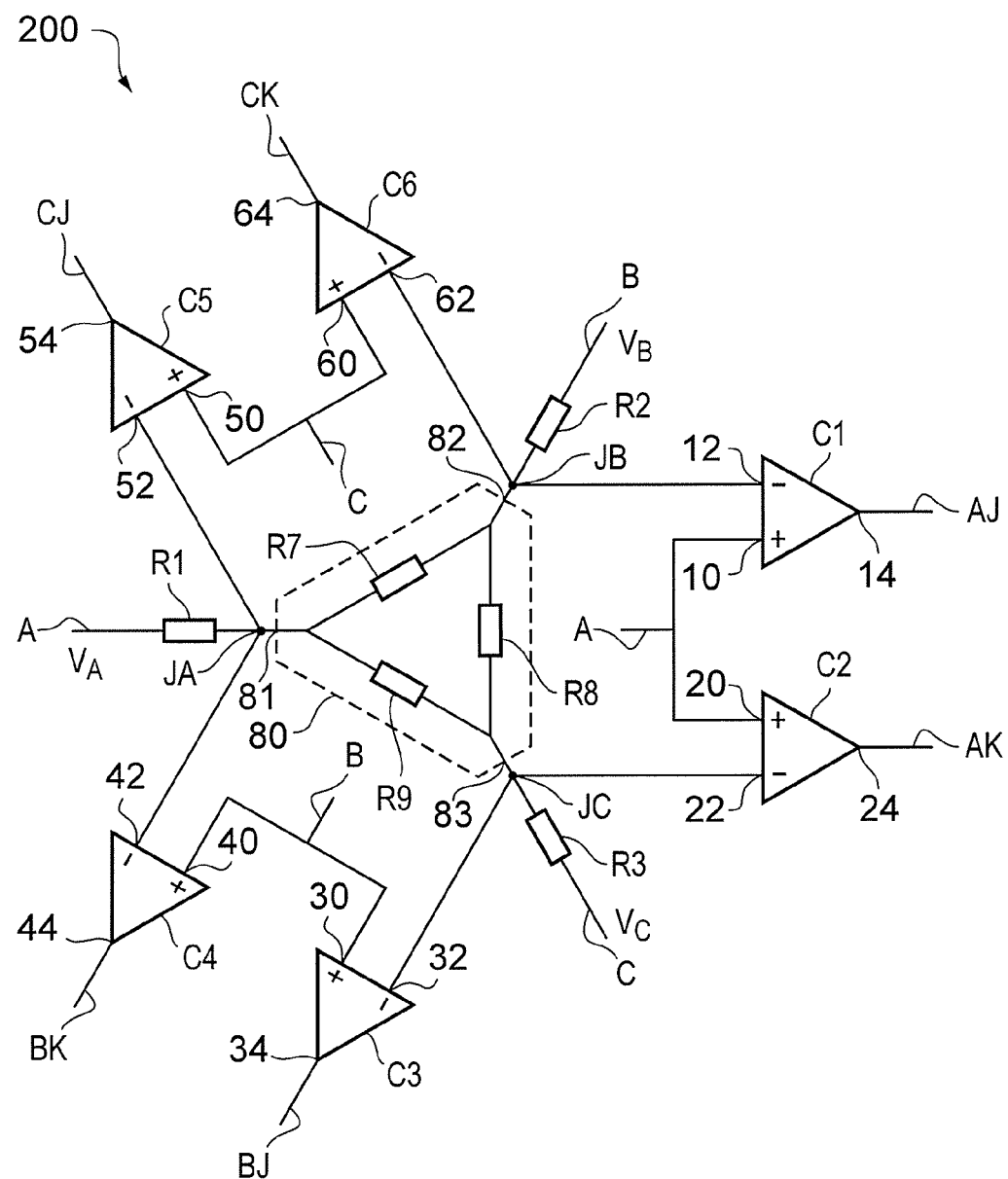
FIG. 7 is a schematic diagram of another embodiment of a receiver.

Another embodiment of a receiver 200 is illustrated in FIG. 7, and is identical to the receiver 100 illustrated in FIG. 1, except that the network 70 of FIG. 1 is replaced in the embodiment of FIG. 7 by a network 80 that has a different arrangement of resistive elements. For brevity, only the differences of the embodiment of FIG. 7, with respect to the embodiment of FIG. 1, are described below.

Referring to FIG. 7, the network 80 of a seventh, an eighth and a ninth resistive element R7, R8, R9 has first, second and third network terminals 81, 82, 83 coupled to, respectively, the first, second and third junction nodes JA, JB, JC. In particular, the seventh resistive element R7 is coupled between the first and second network terminals 81, 82, and so is coupled between the first junction node JA and the second junction node JB. The eighth resistive element R8 is coupled between the second and third network terminals 82, 83, and so is coupled between the second junction node JB and the third junction node JC. The ninth resistive element R9 is coupled between the third and first network terminals 83, 81, and so is coupled between the third junction node JC and the first junction node JA. Therefore, the seventh, eighth and ninth resistive elements R7, R8, R9 are arranged in a triangular topology or triangular configuration. The seventh, eighth and ninth resistive elements R7, R8, R9 each have a resistance that is substantially equal, and therefore, the network 80 is electrically symmetrical, by which it is meant that the impedance of the network 80 between all pairs of its first, second and third network terminals 81, 82, 83 is substantially the same. Such pairs are the first and second network terminals 81, 82, the second and third network terminals 82, 83, and the third and first network terminals 83, 81. In one embodiment, the resistance of the seventh, eighth and ninth resistive elements R7, R8, R9 is substantially triple the resistance of the fourth, fifth and sixth resistive elements R4, R5, R6, although in other embodiments this resistance can be different.

Figure 8:
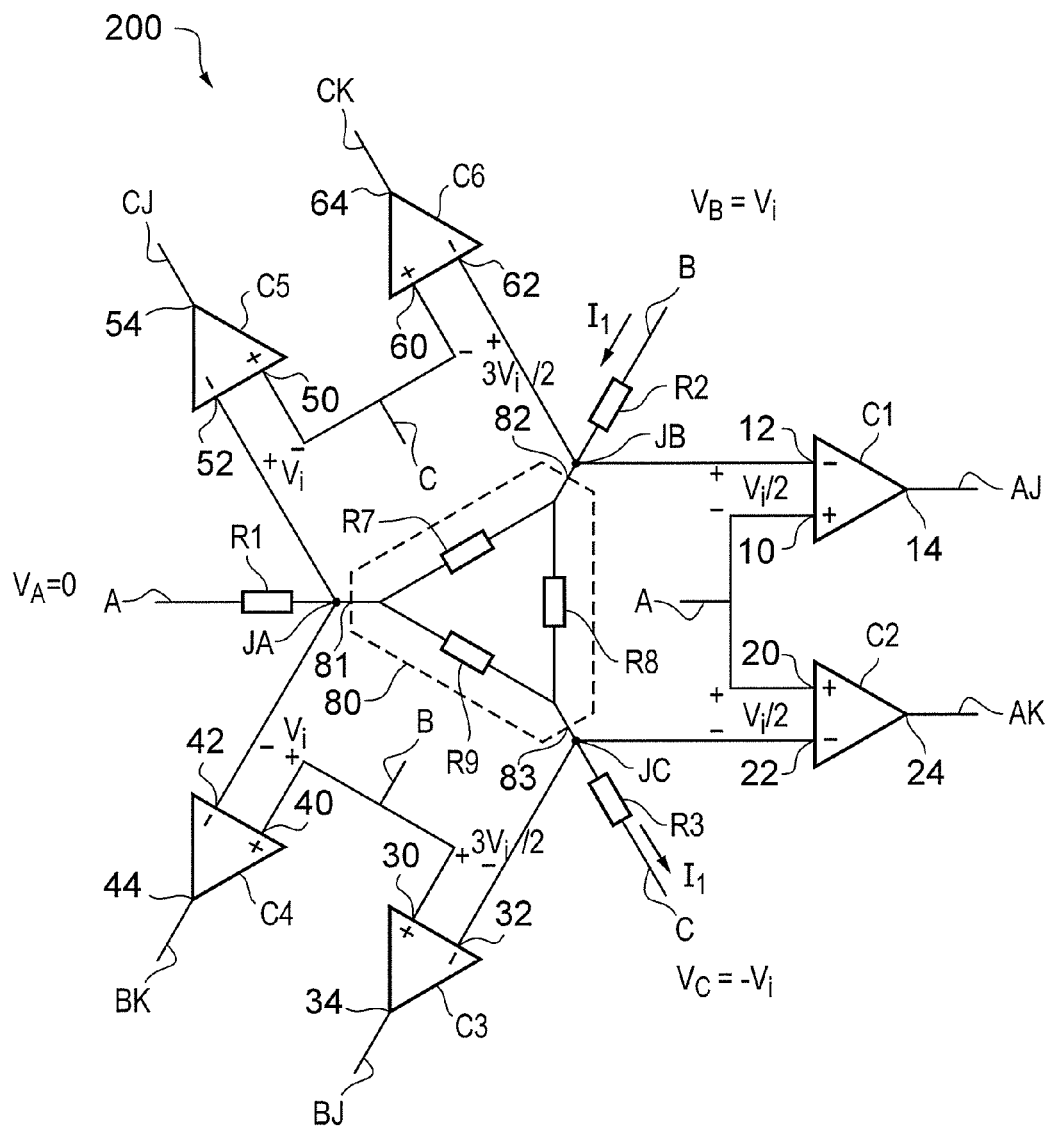
FIG. 8 is a schematic diagram of another embodiment of a receiver illustrating currents and voltages for one state.
Figure 9:
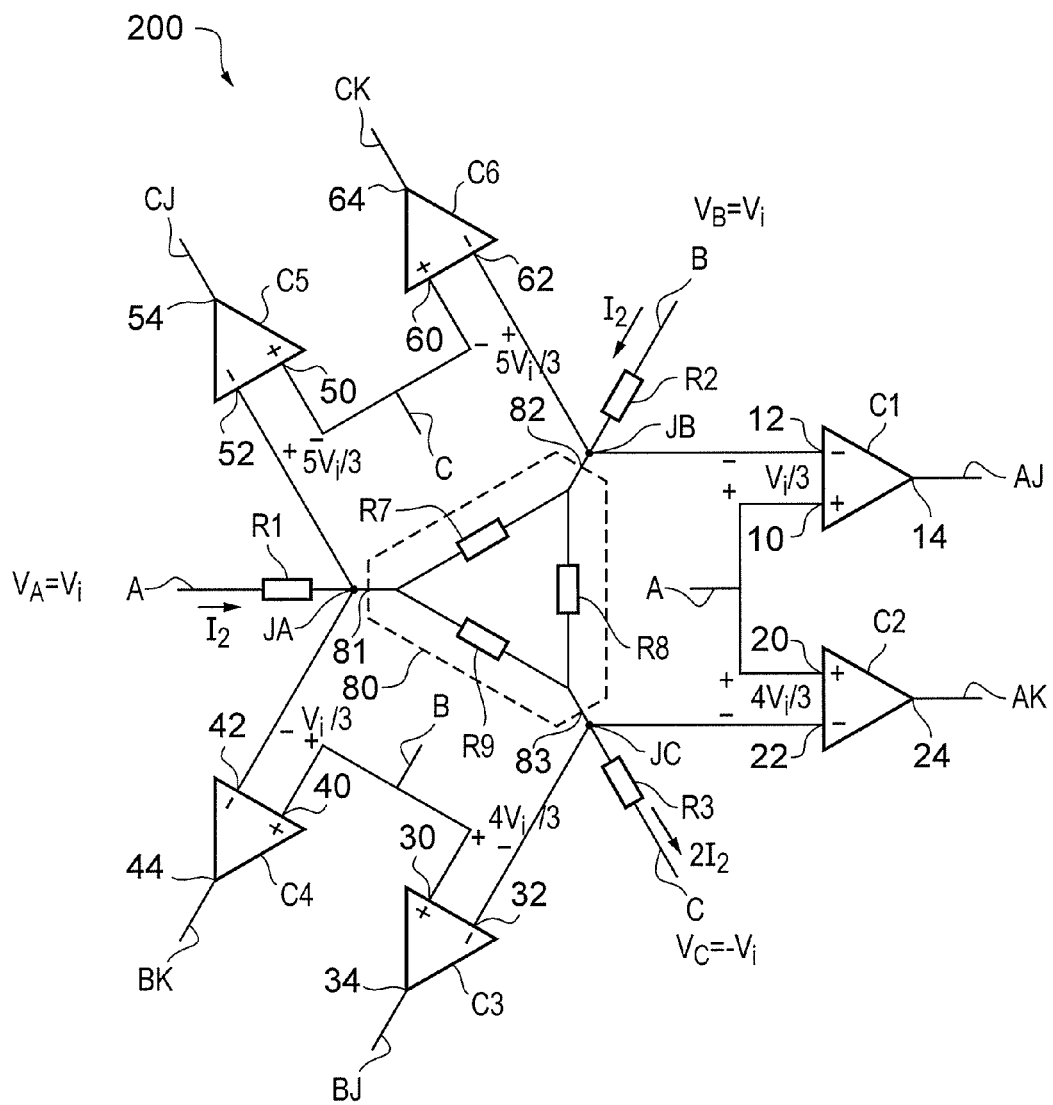
FIG. 9 is a schematic diagram of another embodiment of a receiver illustrating currents and voltages for another state.

The network 80 of FIG. 7 is an equivalent circuit of the network 70 of FIG. 1, and therefore information contained in the table of FIG. 2, and also the method illustrated in FIG. 5, are also applicable to the embodiment of FIG. 7. FIG. 8 reproduces the receiver 200 of FIG. 7, and additionally indicates, for state 6 of the table of FIG. 2, for the case where the resistance of the seventh to ninth resistive elements R7 . . . R9 is triple the resistance of the first to third resistive elements R1 . . . R3, first input terminal voltage $V_A$ being zero, the second input terminal voltage $V_B$ having a value $V_i$ applied at the second input terminal B, and the third input terminal voltage $V_C$ having a value $-V_i$ applied at the third input terminal C. Also indicated in FIG. 7 are the second and third input terminal currents $I_B$, $I_C$ flowing at the second third input terminals B, C, having values of, respectively, $I_1$ and $-I_1$, and the voltage differences established between the respective non-inverting input and inverting input of each of the first to sixth comparators C1 . . . C6. Likewise, FIG. 9 reproduces the receiver 200 of FIG. 7, and additionally indicates, for state 12 of the table of FIG. 2, for the case where the resistance of the seventh to ninth resistive elements R7 . . . R9 is triple the resistance of the first to third resistive elements R1 . . . R3, first and second input terminal voltages $V_A$, $V_B$, having a value $V_i$ applied at the first and second input terminals A, B, and the third input terminal voltage $V_C$ having a value $-V_i$ applied at the third input terminal C. Also indicated in FIG. 9 are the first, second and third input terminal currents $I_A$, $I_B$, $I_C$ flowing at the first to third input terminals A, B, C, and having values of, respectively, $I_2$, $I_2$ and $-2I_2$, and voltage differences established between the respective non-inverting input and inverting input of each of the first to sixth comparators C1 . . . C6. It can be seen that the same voltages are established between the respective non-inverting input and inverting input of each of the first to sixth comparators C1 . . . C6 for the examples in FIGS. 8 and 9 as for the examples in, respectively, FIGS. 3 and 4, and therefore the signals at the first to sixth output terminals AJ, AK, BJ, BK, CJ, CK, are the same as indicated in the table of FIG. 2 for the receiver 100 of FIG. 1. The minimum voltage difference to be detected by each of the first to sixth comparators C1 . . . C6 is the same for the embodiment of FIG. 7 as for the embodiment of FIG. 1. More generally, all of the information contained in the table of FIG. 2 is applicable to the embodiment of FIG. 7, in addition to the embodiment of FIG. 1.

For the case where the seventh to ninth resistive elements R7 . . . R9 have a resistance that is triple the resistance of the first to third resistive elements R1 . . . R3, the minimum voltage difference between the non-inverting and inverting inputs of each of the first to sixth comparators C1 . . . C6 has a magnitude $V_i/2$, for states one to six, and a magnitude $V_i/3$ for states seven to twelve. Therefore, the noise immunity is greater for states one to six than for states seven to twelve. The noise immunity can be increased for states seven to twelve, and simultaneously made equal for all states, albeit by reducing the noise immunity of states one to six, if the seventh, eighth and ninth resistive elements R7, R8, R9 have an equal resistance double the resistance of the first, second and third resistive elements R1, R2, R3. If the resistance of the first, second and third resistive elements R1, R2, R3 is denoted R', and the resistance of the seventh, eighth and ninth resistive elements R7, R8, R9 is denoted R''', the minimum voltage difference between the non-inverting and inverting inputs of any one of the first to sixth comparator C1 . . . C6 is $R'''V_i/(3R'+R''')$ for states one to six, and $2R'V_i/(3R'+R''')$ for states seven to twelve. This minimum voltage difference can be made equal for all twelve states, at a value of $0.4V_i$, by selecting values of R' and R''' such that R''=2R', that is, the seventh, eighth and ninth resistive elements R7, R8, R9 have an equal resistance that is double the resistance of the first, second and third resistive elements.

More generally, selecting the resistance of the seventh, eighth and ninth resistive elements R7, R8, R9 to be in the range from greater than double to less than triple the resistance of the first, second and third resistive elements R1, R2, R3 can ensure that the minimum voltage difference between the non-inverting and inverting inputs of each of the first to sixth comparator C1 . . . C6 is in the range $0.4V_i$ to $V_i/3$. This range of resistances of the seventh, eighth and ninth resistive elements R7, R8, R9 may be expressed as 2R'<R'''<3R'.

In applications where a smaller minimum voltage difference between the non-inverting and inverting inputs of any one of the first to sixth comparator C1 . . . C6, is acceptable, thereby providing reduced noise immunity, the resistance of the seventh, eighth and ninth resistive elements R7, R8, R9 may be selected outside of the range from double to triple the resistance of the first, second and third resistive elements R1, R2, R3. However, in order to avoid degrading the noise immunity substantially, it is preferred that the resistance of the seventh, eighth and ninth resistive elements R7, R8, R9 is within the range from equal to five times, the resistance of the first, second and third resistive elements R1, R2, R3. This range of resistances of the seventh, eighth and ninth resistive elements R7, R8, R9 may be expressed as R'≤R'''≤5R'.

Figure 10:
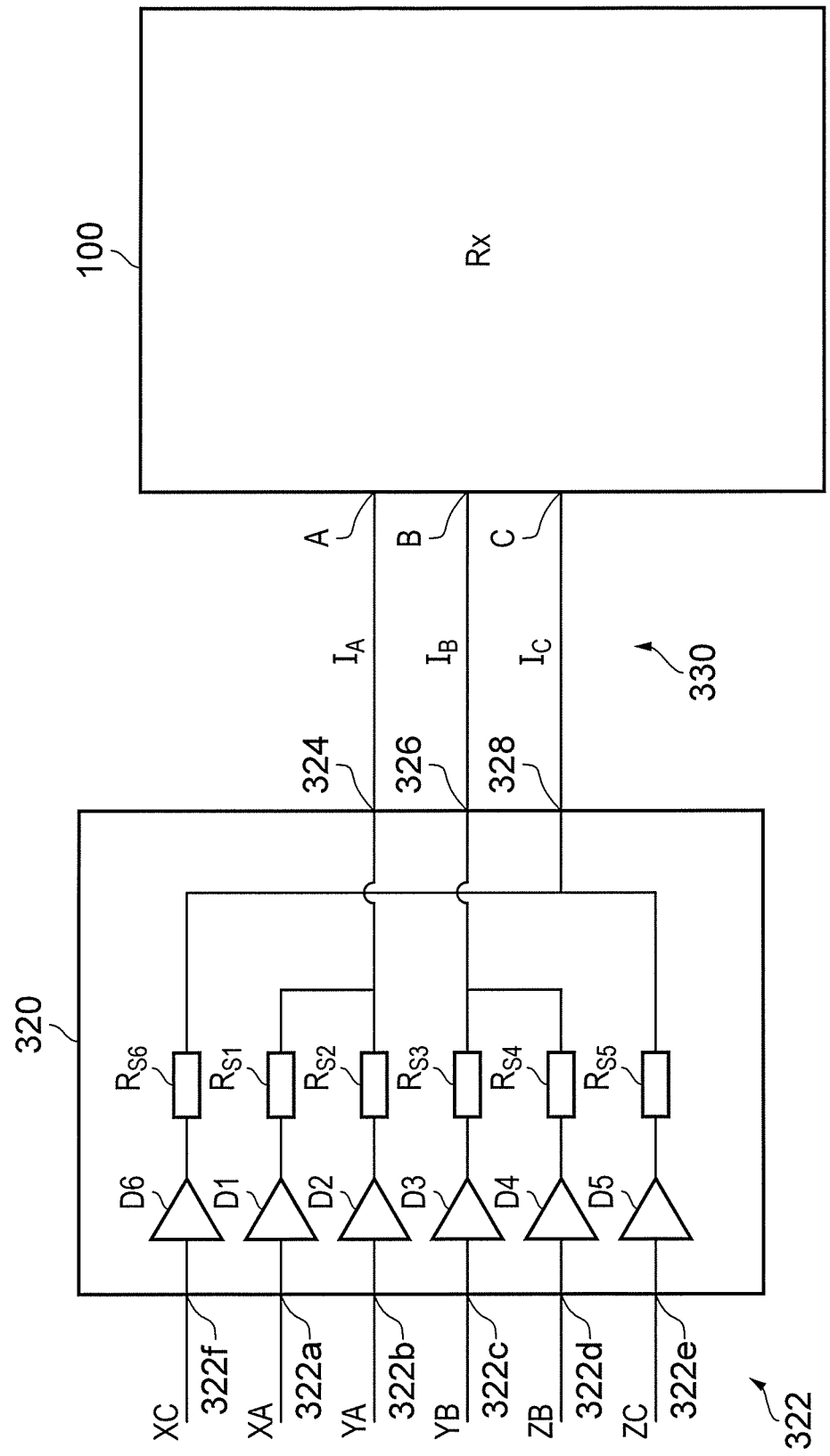
FIG. 10 is a schematic diagram of a transmitter coupled to a receiver.

Referring to FIG. 10, there is illustrated an embodiment of the transmitter 320 coupled, by means of the three-wire connection 330, to the receiver 100 described with reference to FIG. 1, or equivalently the receiver 200 described with reference to FIG. 7. The embodiment illustrated in FIG. 10 is a voltage mode transmitter, although a current mode transmitter may alternatively be employed. The input 322 of the transmitter 320 comprises first to sixth input lines 322a to 322f for receiving from the encoder 310 respective first to sixth transmitter input signals XA, YA, YB, ZB, ZC, XC. The first input line 322a is coupled to an input of a first driver D1, and an output of the first driver D1 is coupled to the first output 324 of the transmitter 320 by means of a first source resistive element $R_{S1}$. The second input line 322b is coupled to an input of a second driver D2, and an output of the second driver D2 is coupled to the first output 324 of the transmitter 320 by means of a second source resistive element $R_{S2}$. The third input line 322c is coupled to an input of a third driver D3, and an output of the third driver D3 is coupled to the second output 326 of the transmitter 320 by means of a third source resistive element $R_{S3}$. The fourth input line 322d is coupled to an input of a fourth driver D4, and an output of the fourth driver D4 is coupled to the second output 326 of the transmitter 320 by means of a fourth source resistive element $R_{S4}$. The fifth input line 322e is coupled to an input of a fifth driver D5, and an output of the fifth driver D5 is coupled to the third output 328 of the transmitter 320 by means of a fifth source resistive element $R_{S5}$. The sixth input line 322f is coupled to an input of a sixth driver D6, and an output of the sixth driver D6 is coupled to the third output 328 of the transmitter 320 by means of a sixth source resistive element $R_{S6}$. Each of the first to sixth source resistive elements $R_{S1}$ to $R_{S6}$ has the same resistance as each other. Each of the first to sixth drivers D1 to D6 may be, for example, a buffer, or a non-inverting amplifier.

The table of FIG. 11 illustrates a mapping between the first to sixth transmitter input signals XA, YA, YB, ZB, ZC, XC, denoted control signals in FIG. 11, and the resulting first, second and third input terminal currents $I_A$, $I_B$, $I_C$ and first, second and third input terminal voltages $V_A$, $V_B$, $V_C$ provided at, respectively, the first, second and third outputs 324, 326, 328 of the transmitter 320, when coupled to the receiver 100 described with reference to FIG. 1 or the receiver 200 described with reference to FIG. 7. In order that one of the first, second and third outputs 324, 326, 328 of the transmitter 320 provide a zero current and a zero, or floating, voltage, binary signals of opposite polarity are applied to the two input lines that are coupled to the respective first, second or third outputs 324, 326, 328 of the transmitter 320. It is immaterial which way round these binary signals of opposite polarity are applied, and this flexibility is indicated in the table of FIG. 11 by alternatives in parentheses, for example for the fifth and sixth transmitter input signals ZC, XC for the first and second states. Desired values of the first, second and third input terminal currents $I_A$, $I_B$, $I_C$ and first, second and third input terminal voltages $V_A$, $V_B$, $V_C$ at the first, second and third outputs 324, 326, 328 of the transmitter 320 may be selected by appropriate choice of resistance of the first to sixth source resistive elements $R_{S1}$ to $R_{S6}$, in relation to the resistance of the first, second and third resistive elements R1, R2, R3 of the receiver 100.

Each pair of the first to sixth drivers D1 . . . D6 coupled to the respective first, second and third outputs 324, 326, 328 of the transmitter 320 forms a tri-state driver. In other words, the first and second drivers, D1, D2 together form a first tri-state driver, the third and fourth drivers D3, D4 together form a second tri-state driver, and the fifth and sixth drivers D5, D6 together form a third tri-state driver. The three states of each of these tri-state drivers correspond to the pair of drivers being driven by a binary signal of the same polarity, which can be either a binary one or a binary zero, and by binary signals of opposite polarities.

The table of FIG. 2 illustrates a mapping between the twelve states and the first, second and third input terminal voltages $V_A$, $V_B$, $V_C$ in which three different voltage values are employed, namely 0 and $\pm V_i$ and the first, second and third input terminal currents $I_A$, $I_B$, $I_C$ in which seven different current levels are employed, namely 0, $\pm I_1$, $\pm I_2$ and $\pm 2I_2$. Three is the minimum number of voltage levels, and seven is the minimum number of current levels required by the receivers 100, 200 described with reference to FIGS. 1 and 7 for receiving and distinguishing twelve different states.

Although embodiments have been described in which values of the first, second and third input terminal voltages $V_A$, $V_B$, $V_C$ are selected from $V_i$ and $-V_i$, it is not essential for these voltages to have an equal magnitude, and not essential for these voltages to have opposite polarity for representing different binary values. More generally, values of the first, second and third input terminal voltages $V_A$, $V_B$, $V_C$ may be selected from any two non-equal values $V_1$ and $V_2$. In this case, the intermediate voltage may be expressed generally as the average of $V_1$ and $V_2$, that is, $(V_1+V_2)/2$, and therefore need not be zero.

Other embodiments of the transmitter 320 may be used in conjunction with any embodiments of the receiver 100, 200 described herein. A transmitter may be used that employs drivers that have, when one of the first, second and third input terminal currents $I_A$, $I_B$, $I_C$ is zero, a high impedance state in which the respective one of the first, second and third input terminal voltages $V_A$, $V_B$, $V_C$ is undefined and therefore floating, and the respective one of the first, second and third input terminal currents $I_A$, $I_B$, $I_C$ is zero because no current path is provided. With such a transmitter, the intermediate voltage, expressed generally as $(V_1+V_2)/2$, can be established as a floating voltage by a driver in the high impedance state. Alternatively, a transmitter may be used that employs drivers that have a low impedance, in which case one of the first, second and third input terminal currents $I_A$, $I_B$, $I_C$ can be zero when the respective one of the first, second and third input terminal voltages $V_A$, $V_B$, $V_C$ is at the intermediate voltage which, rather than floating at an undefined voltage, is set at $(V_1+V_2)/2$, and in particular zero volts when $V_1$ and $V_2$ are equal in magnitude and opposite in polarity. For high signal integrity, the low impedance drivers are preferred as their impedance can be well matched to the impedance of the wires of the three-wire digital interface, thereby avoiding waves being reflected back to the receiver 100 from the transmitter, whereas with the high impedance drivers and the floating voltage, the impedance of the drivers may not be well matched to the impedance of the wires of the three-wire digital interface.

Although the decoder 340 has been presented as a separate entity from the receiver 100, 200, alternatively, the decoder 340 may be incorporated within the receiver 100, 200.

Although the receiver 100, 200 is adapted for receiving twelve states of the currents on a three-wire interface, it may be employed for receiving fewer states, for example nine states, with enhanced noise immunity by using a sub-set of the twelve states, in which case a simplified transmitter adapted to transmit fewer than twelve states maybe employed. The nine states may be used to convey, for example, six bits of data using DDR, and a clock. The nine states may be, for example, the states one to seven, nine and eleven illustrated in the table of FIG. 2.

Figure 12:
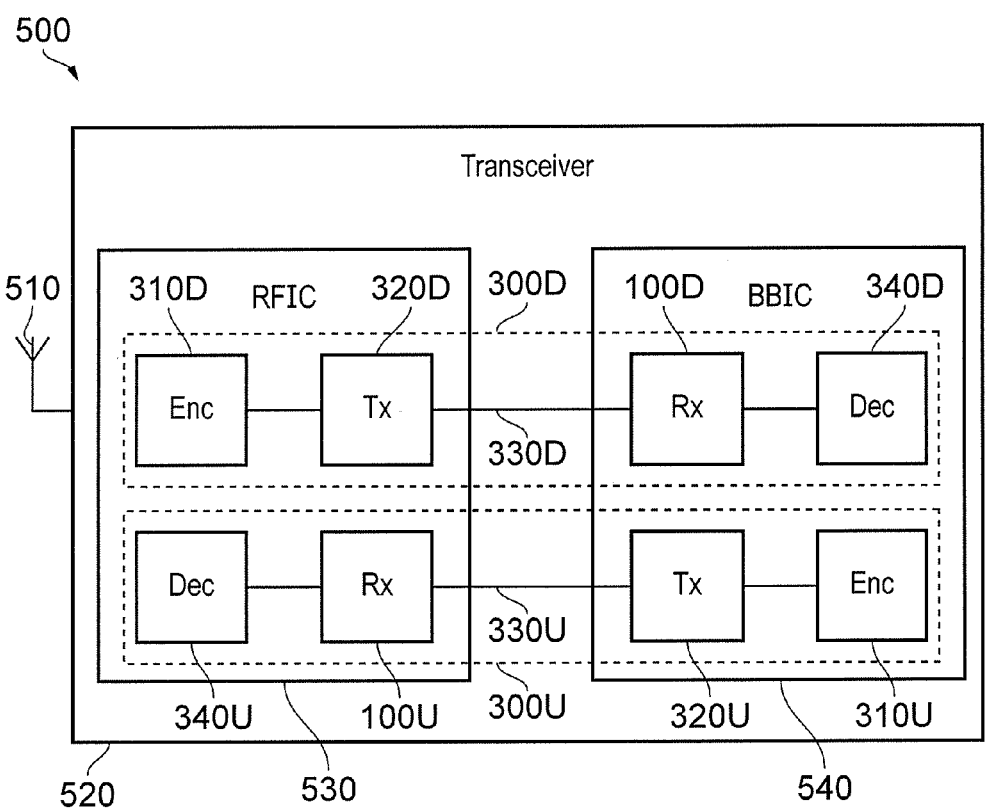
FIG. 12 is a schematic diagram of a wireless communication device.

Referring to FIG. 12, a wireless communication device 500 comprises an antenna 510 coupled to a transceiver 520. The transceiver 520 comprises an RF integrated circuit (RFIC) 530 coupled to a baseband integrated circuit (BBIC) 540. The signalling system 300 described with reference to FIG. 6 is employed for communication between the RFIC 530 and the BBIC 540, and conveys downlink information, that is, information received by the wireless communication device 500, and is referred to below as a downlink signalling system and is referenced 300D in FIG. 12. Elements of the downlink signalling system 300D have the same reference numerals as the elements of the signalling system 300 of FIG. 6 with an additional suffix D. Therefore, the downlink signalling system 300D comprises, in the RFIC 530, an encoder 310D coupled a transmitter 320D, and, in the BBIC 540, a receiver 100D coupled to a decoder 340D. The transmitter 320D and the receiver 100D are coupled by means of a three-wire interface 330D.

Another instance of the signalling system 300 described with reference to FIG. 6 is employed for communication between the RFIC 530 and the BBIC 540, and conveys uplink information, that is, information transmitted from the wireless communication device 500, and is referred to below as an uplink signalling system and is referenced 300U in FIG. 12. Elements of the uplink signalling system 300U have the same reference numerals as the elements of the signalling system 300 of FIG. 6 with an additional suffix U. Therefore, the uplink signalling system 300U comprises, in the BBIC 540, an encoder 310U coupled to a transmitter 320U, and, in the RFIC 540, a receiver 100U coupled to a decoder 340U. The transmitter 320U and the receiver 1000 are coupled by means of a three-wire interface 330U.

The receiver 100, 200 may be employed for the signalling system 300 to transfer raw data from a delta-sigma analog-to-digital converter (ADC) in an RFIC, to a BBIC. The ADC raw data may be either 1-bit or 7-level thermometer code, so with the signalling system 300 and using nine of the twelve states, thermometer coded data from an in-phase channel and a quadrature-phase channel can be transferred from an RFIC to a BBIC without any rounding errors. Alternatively, such a signalling system 300 may be used on-chip between the ADC and a decision feedback equalizer (DFE) within the RFIC.

By adding, to the signalling system 300, two wires to implement an additional low voltage differential signalling (LVDS) interface using DDR, both a clock signal and eight bits of data can be transmitted over five wires in one clock cycle using standard complimentary metal-oxide semiconductor (CMOS) circuitry. Data rates used for transmission to a wireless communications terminal from a base station, that is, on a downlink, are generally much higher than data rates used for transmission from a wireless communications terminal to a base station, that is, on an uplink. Therefore, a three-wire interface may be used in a wireless communications terminal for the downlink communication, and the five-wires described in the preceding paragraph may be used in the wireless communication terminal for the uplink communication, with similar clock frequencies, and resulting in a total of eight wires for a bidirectional interface supporting both uplink and downlink communication.

Although the disclosure is described with reference to LTE and digital interface standards specified by the MIPI Alliance, the disclosure is not limited to these standards but has application to other digital interfaces. Similarly, although the disclosure is described with reference to a wireless communication device, the disclosure is not limited to such a device, but has application to other electronic devices incorporating a digital interface.

Other variations and modifications will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A receiver for a three-wire digital interface, comprising:
   first, second and third input terminals;
   first, second, third, fourth, fifth and sixth output terminals;
   first, second and third junction nodes;
   a first resistive element coupled between the first input terminal and the first junction node;
   a second resistive element coupled between the second input terminal and the second junction node;
   a third resistive element coupled between the third input terminal and the third junction node;
   a network comprising first, second and third network terminals coupled to, respectively, the first, second and third junction nodes the network having substantially the same impedance between all pairs of the first, second and third network terminals;
   a first comparator having a non-inverting input coupled to the first input terminal, an inverting input coupled to the second junction node, and an output coupled to the first output terminal;
   a second comparator having a non-inverting input coupled to the first input terminal, an inverting input coupled to the third junction node, and an output coupled to the second output terminal;
   a third comparator having a non-inverting input coupled to the second input terminal, an inverting input coupled to the third junction node, and an output coupled to the third output terminal;
   a fourth comparator having a non-inverting input coupled to the second input terminal, an inverting input coupled to the first junction node, and an output coupled to the fourth output terminal;
   a fifth comparator having a non-inverting input coupled to the third input terminal, an inverting input coupled to the first junction node, and an output coupled to the fifth output terminal; and a sixth comparator having a non-inverting input coupled to the third input terminal, an inverting input coupled to the second junction node, and an output coupled to the sixth output terminal.

2. The receiver as claimed in claim 1, wherein the network comprises:
   a fourth resistive element coupled between the first network terminal and a common node;
   a fifth resistive element coupled between the second network terminal and the common node; and
   a sixth resistive element coupled between the third network terminal and the common node.

3. The receiver as claimed in claim 2, wherein the first, second and third resistive elements have substantially equal resistance, and the fourth, fifth and sixth resistive elements each have a substantially equal resistance in the range 0.33 times to 1.67 times the resistance of the first, second and third resistive elements.

4. The receiver as claimed in claim 2, wherein the first, second and third resistive elements have substantially equal resistance, and the fourth, fifth and sixth resistive elements each have a substantially equal resistance in the range greater than 0.67 times the resistance of the first, second and third resistive elements to less than the resistance of the first, second and third resistive elements.

5. The receiver as claimed in claim 2, wherein the first, second, third, fourth, fifth and sixth resistive elements have substantially equal resistance.

6. The receiver as claimed in claim 2, wherein the first, second and third resistive elements have substantially equal resistance, and the fourth, fifth and sixth resistive elements each have a substantially equal resistance two thirds times the resistance of the first, second and third resistive elements.

7. The receiver as claimed in claim 1, wherein the network comprises:
   a fourth resistive element coupled between the first network terminal and the second network terminal;
   a fifth resistive element coupled between the second network terminal and the third network terminal; and
   a sixth resistive element is coupled between the third network terminal and the first network terminal.

8. The receiver as claimed in claim 7, wherein the first, second and third resistive elements have substantially equal resistance, and the fourth, fifth and sixth resistive elements each have a substantially equal resistance in the range equal to the resistance of the first, second and third resistive elements to five times the resistance of the first, second and third resistive elements.

9. The receiver as claimed in claim 7, wherein the first, second and third resistive elements have substantially equal resistance, and the fourth, fifth and sixth resistive elements each have a substantially equal resistance in the range greater than double to less than triple the resistance of the first, second and third resistive elements.

10. The receiver as claimed in claim 7, wherein the first, second and third resistive elements have substantially equal resistance, and the fourth, fifth and sixth resistive elements each have a substantially equal resistance three times the resistance of the first, second and third resistive elements.

11. The receiver as claimed in claim 7, wherein the first, second and third resistive elements have substantially equal resistance, and the fourth, fifth and sixth resistive elements each have a substantially equal resistance double the resistance of the first, second and third resistive elements.

12. A signaling system comprising an encoder, a transmitter coupled downstream to the encoder, a receiver as claimed in claim 1 and coupled downstream to the transmitter, and a decoder coupled downstream to the receiver.

13. A wireless communication device comprising a signaling system as claimed in claim 12.

14. A method of operating a three-wire digital interface, comprising:
   providing a receiver as claimed in claim 1;
   establishing voltages at the first, second and third input terminals; and
   selecting, dependent on the voltages, different output states of the receiver.

15. The method as claimed in claim 14, wherein for at least one of the output states two of the first, second and third input terminals are at a common voltage and a third one of the first, second and third input terminals is at a different voltage.

16. The method as claimed in claim 14, wherein for at least one of the output states the first, second and third input terminals are at different voltages, wherein one of the first, second and third input terminals is at an intermediate voltage midway between the voltages of the other two of the first, second and third input terminals.

17. The method of operating a three-wire digital interface as claimed in claim 14, comprising providing twelve output states of the receiver; wherein for six of the twelve output states two of the first, second and third input terminals are at a common voltage and a third one of the first, second and third input terminals is at a different voltage; and wherein for another six of the twelve output states the first, second and third input terminals are at different voltages with one of the first, second and third input terminals at an intermediate voltage midway between the voltages of the other two of the first, second and third input terminals.

* * * * *

UNITED STATES PATENT AND TRADEMARK OFFICE
CERTIFICATE OF CORRECTION

| | |
|---|---|
| PATENT NO. | : 9,491,015 B2 |
| APPLICATION NO. | : 14/892739 |
| DATED | : November 8, 2016 |
| INVENTOR(S) | : Kimmo Koli |

It is certified that error appears in the above-identified patent and that said Letters Patent is hereby corrected as shown below:

In the Specification

In Column 17, Line 39, delete "RFIC 540," and insert -- RFIC 530, --, therefor.

In Column 17, Line 40, delete "1000" and insert -- 100U --, therefor.

Signed and Sealed this
Twenty-fifth Day of October, 2022

*Katherine Kelly Vidal*

Katherine Kelly Vidal
*Director of the United States Patent and Trademark Office*